United States Patent
Beaugh et al.

(10) Patent No.: US 11,003,703 B1
(45) Date of Patent: May 11, 2021

(54) SYSTEM AND METHOD FOR AUTOMATIC SUMMARIZATION OF CONTENT

(71) Applicant: ZIGNAL LABS, INC., San Francisco, CA (US)

(72) Inventors: Adam Beaugh, Kensington, CA (US); Andras Benke, Bellevue, WA (US); Jay Buckingham, Vancouver, WA (US); Jonathan R. Dodson, San Francisco, CA (US); Jeffrey Fenchel, San Francisco, CA (US); Loretta Jimenez, San Francisco, CA (US); Michael Kramer, San Francisco, CA (US); David Lineberger, Oakland, CA (US); Antonio Maldonado, Sunnyvale, CA (US); Felix Medina Wong, Fremont, CA (US); Alex Smith, Chadron, NE (US); Fabien Vives, San Francisco, CA (US)

(73) Assignee: ZIGNAL LABS, INC., San Francisco, CA (US)

( * ) Notice: Subject to any disclaimer, the term of this patent is extended or adjusted under 35 U.S.C. 154(b) by 0 days.

(21) Appl. No.: 16/235,919

(22) Filed: Dec. 28, 2018

Related U.S. Application Data

(60) Provisional application No. 62/612,539, filed on Dec. 31, 2017.

(51) Int. Cl.
*G06F 17/00* (2019.01)
*G06F 16/34* (2019.01)
*G06N 3/08* (2006.01)
*G06F 16/906* (2019.01)
*G06N 3/04* (2006.01)

(52) U.S. Cl.
CPC .......... *G06F 16/345* (2019.01); *G06F 16/906* (2019.01); *G06N 3/0472* (2013.01); *G06N 3/08* (2013.01)

(58) Field of Classification Search
CPC ... G06F 16/345; G06F 16/906; G06N 3/0472; G06N 3/08
See application file for complete search history.

(56) References Cited

U.S. PATENT DOCUMENTS

| | | | |
|---|---|---|---|
| 8,326,880 B2 | 12/2012 | Carson, Jr. et al. | |
| 8,719,283 B2 | 5/2014 | Koski | |

(Continued)

*Primary Examiner* — Andrew T McIntosh
(74) *Attorney, Agent, or Firm* — Graesar Associates International Inc.; Dvorah Graeser

(57) ABSTRACT

Embodiments disclose a method for automatic summarization of content. The method includes accessing a plurality of stories from a plurality of data sources for a predefined time. Each story is associated with a media item. The method includes plotting the plurality of stories over the predefined time for determining one or more peaks and extracting a set of stories from the one or more peaks. The method includes detecting one or more themes from the set of stories using LDA algorithm. Each theme is associated with a group of stories. The method further includes determining at least one subset of stories for each theme from the group of stories representing the set of stories in the one or more peaks using RBM algorithm. The method includes generating a summarized content for each user based on an associated user profile and the at least one subset of stories.

20 Claims, 10 Drawing Sheets

(56) References Cited

U.S. PATENT DOCUMENTS

| | | | |
|---|---|---|---|
| 8,892,523 B2 | 11/2014 | Amarendran | |
| 9,852,111 B2 | 12/2017 | Dasgupta et al. | |
| 9,886,501 B2 | 2/2018 | Krishnamurthy et al. | |
| 2013/0124556 A1* | 5/2013 | Chowdhury | G06F 16/90335 707/769 |
| 2015/0154305 A1* | 6/2015 | Lightner | G06F 16/951 707/726 |
| 2015/0310862 A1* | 10/2015 | Dauphin | G06F 40/30 704/257 |
| 2018/0005131 A1 | 1/2018 | Yin et al. | |

* cited by examiner

SYSTEM AND METHOD FOR AUTOMATIC SUMMARIZATION OF CONTENT

TECHNICAL FIELD

The present disclosure relates to data mining and, more particularly to, automatic summarization of content such as news content, event information, or textual documents.

BACKGROUND

The usage of data mining and data analytics for consumer based applications has tremendously grown in the last several years. One popular platform where data mining and analytics have found widespread application is content (e.g., advertisements, news, etc.) delivery. Content or advertisement delivery is a way of promoting brands/products among consumers and increasing and strengthening the customer base in a market.

Customers wish to remain updated about certain brands, products, events or personalities by following news, articles/blogs or social media posts. Based on information published on such media, customers may build their own perception of the brands, products, events or personalities. Currently, most brands employ public relations (PR) officers and/or marketing professionals to constantly monitor what the world is saying about them or their products and services on various media platforms, and to understand the differing sentiments from such information. These professionals are required to summarize the key topics from such information and to understand the sentiments from the summary, which they can use to convey the customer's perception of the brands.

However, the amount of data concerning what is being said and written about a brand is currently massive. In addition to traditional newspaper articles and broadcast media reports, there can be tens of thousands of online stories such as social media posts about a brand or a product per day. Moreover, the number of posts about one particular topic important to a brand can explode in a very quick time.

With growth in the volume of data by each passing hour, manual monitoring becomes difficult and slow. Manual monitoring can only provide summary statistics of what happened a day before or over a previous week, but may not provide the much needed information about what has happened in the immediate past (e.g., over last few hours). In addition, manual handling of such large volumes of data (stories) is subject to human error. When there are tens of thousands of stories, it would be nearly impossible for a team of humans to quickly summarize the key topics of the conversation in the stories. Moreover, it is important to understand the transition of these stories from one media source/platform to another in order to identify the sentiments of the audience.

In light of the above discussion, there is a need for a faster and automated platform for delivering summarized content and topics to relevant consumers.

SUMMARY

Various embodiments of the present disclosure provide system and method for automatic summarization of content In an embodiment, a method for automatic summarization of content is disclosed. The method includes accessing, by a processor, a plurality of stories from a plurality of data sources for a predefined time. Each story of the plurality of stories is associated with a media item. The method includes plotting, by the processor, the plurality of stories over the predefined time for determining one or more peaks. The method also includes extracting, by the processor, a set of stories among the plurality of stories from each peak of the one or more peaks in the predefined time. The method includes detecting, by the processor, one or more themes from the set of stories using Latent Dirichlet Allocation (LDA) algorithm for classifying the set of stories based on the one or more themes. Each theme of the one or more themes is associated with a group of stories. The method further includes determining, by the processor, at least one subset of stories for each theme from the group of stories representing the set of stories in the one or more peaks using Restricted Boltzmann Machines (RBM) algorithm. The method includes accessing, by the processor, one or more user profiles of one or more users. Each user profile includes profile information related to a user of the one or more users. The method furthermore includes generating, by the processor, a summarized content for each user of the one or more users based on an associated user profile and the at least one subset of stories. The summarized content being an aggregation of the at least one subset of stories based on an associated theme.

In another embodiment a server system is disclosed. The server system includes a memory to store instructions and a processor to execute the stored instructions in the memory and thereby cause the server system to perform a method. The method includes accessing, by a processor, a plurality of stories from a plurality of data sources for a predefined time. Each story of the plurality of stories is associated with a media item. The method includes plotting, by the processor, the plurality of stories over the predefined time for determining one or more peaks. The method also includes extracting, by the processor, a set of stories among the plurality of stories from each peak of the one or more peaks in the predefined time. The method includes detecting, by the processor, one or more themes from the set of stories using Latent Dirichlet Allocation (LDA) algorithm for classifying the set of stories based on the one or more themes. Each theme of the one or more themes is associated with a group of stories. The method further includes determining, by the processor, at least one subset of stories for each theme from the group of stories representing the set of stories in the one or more peaks using RBM algorithm. The method includes accessing, by the processor, one or more user profiles of one or more users. Each user profile includes profile information related to a user of the one or more users. The method furthermore includes generating, by the processor, a summarized content for each user of the one or more users based on an associated user profile and the at least one subset of stories. The summarized content being an aggregation of the at least one subset of stories based on an associated theme.

In yet another embodiment, a summarization engine for automatic summarization of content is disclosed. The summarization engine includes a memory, a communication interface and a processor. The memory is configured to store summarization instructions. The communication interface is configured to receive a plurality of stories from a plurality of data sources at a predefined interval. Each story of the plurality of stories being associated with a media item. The processor is in operative communication with the communication interface. The processor is configured to execute the summarization instruction to cause the summarization engine to perform the method. The method includes plotting the plurality of stories over the predefined time for determining one or more peaks. The method also includes extracting a set of stories among the plurality of stories from each peak of the one or more peaks in the predefined time. The method includes detecting one or more themes from the set of stories using Latent Dirichlet Allocation (LDA) algorithm for classifying the set of stories based on the one or more themes. Each theme of the one or more theme being associated with a group of stories. The method further includes determining at least one subset of stories for each theme from the group of stories representing the set of stories in the one or more peaks using RBM algorithm. The method furthermore includes generating a summarized content based on the at least one subset of stories.

BRIEF DESCRIPTION OF THE FIGURES

For a more complete understanding of example embodiments of the present technology, reference is now made to the following descriptions taken in connection with the accompanying drawings in which.

Figure 1:
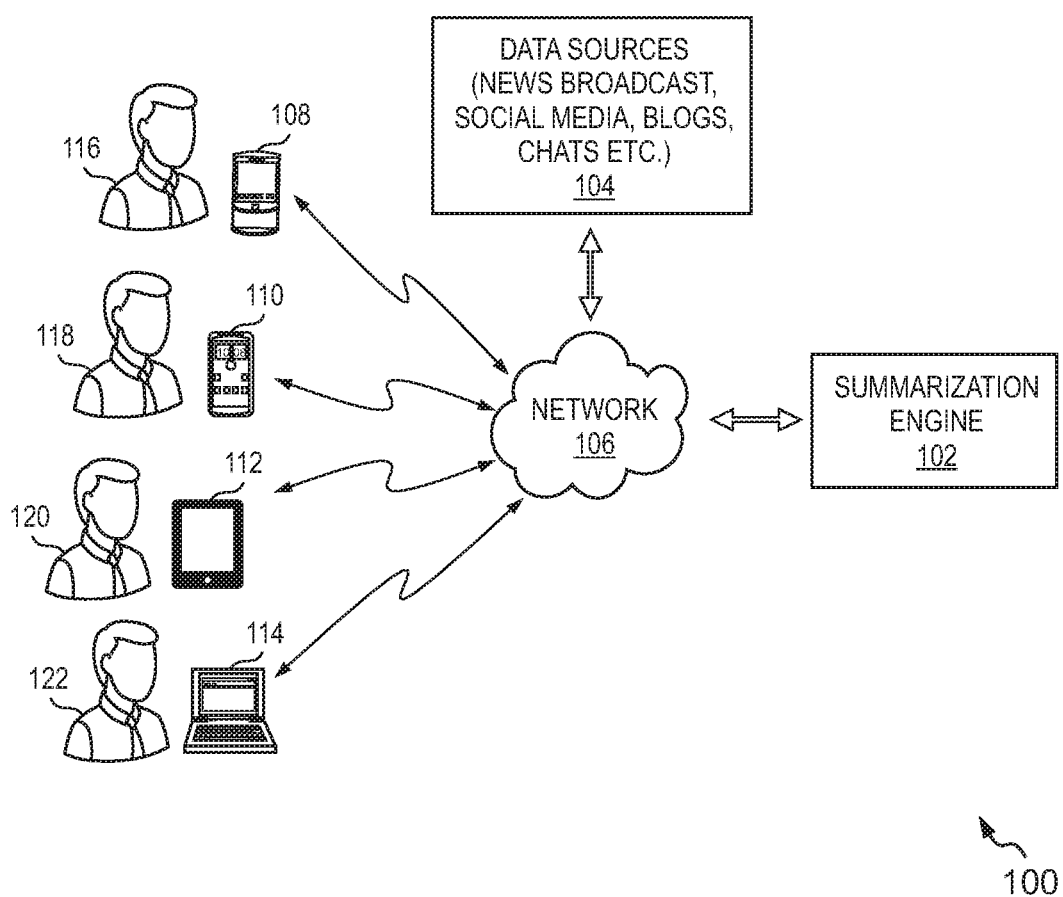
FIG. 1 is an illustration of an environment in which a summarization engine for automatic topic/content summarization is deployed, related to at least some embodiments.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "information", "stories", "content" and "media content" may be used interchangeably herein. Further, the terms "customer", "user" and "audience" may be used interchangeably herein. Furthermore, the terms "topic" and "theme" may be used interchangeably herein.

Overview

In an example scenario, a user may subscribe for newsfeeds from a particular brand. The news feed may provide summarized content at predefined time for the user as requested so as to update the user regarding an understanding of public's sentiment towards the brand. The user may be PR, marketing and communication professionals associated with the brand or any relevant audience, for example, a customer interested in the brand or a news reporter associated with reporting trends in a market.

Various example embodiments of the present disclosure provide systems and methods for automatic summarization of content. The automatic summarization of content may be performed by a processor or a summarization engine. The summarization engine accesses a plurality of stories from a plurality of data sources at predefined times. The plurality of stories may relate to one or many brands, products, services, businesses, events and personalities, among others. Each story of the plurality of stories may be a media item (e.g., post, tweet, a piece of news, etc.). The data sources may be any of a social networking platform, a newspaper, a news broadcasting platform, an e-commerce website, a blog, a magazine, and a talk show.

The summarization engine plots the plurality of stories for the predefined time and peaks (e.g., maximum, minimum, standard deviation) are determined from the plot. A set of stories representative of the peaks are identified from the peaks. Further, the summarization engine is configured to determine one or more themes associated with the set of stories in the peaks using Latent Dirichlet Allocation (LDA) algorithm. This enables dimensionality reduction wherein stories with same/related themes are merged/collapsed together under a single theme. Accordingly, each theme may be associated with a group of stories with related/similar themes. The summarization engine is further configured to train Restricted Boltzmann Machines (RBM) models (based on RBM algorithm) for determining a subset of stories in each theme that ideally represents the set of stories in the peak. More specifically, the subset of stories may correspond to trending stories that are being widely accessed/discussed about in the media.

The summarization engine accesses user profile of one or more users for customizing the subset of stories based on preferences of each user. The user profile may be a social/professional networking profile of a user, browsing history of a customer, interests/hobbies of a user, and the like. The user profile is studied or analyzed to customize the subset of stories according to the user preference and generate customized subset of stories for the user. Accordingly, the summarized content is generated based on the user profile and the subset of stories. The summarized content may be provided/published to the users based on a mode of communication selected/preferred by the user. For example, text messages, social media posts, new snippets, notifications, emails and the like may be used to provide the summarized content for the users.

Various example embodiments of present invention are described hereinafter with reference to FIGS. 1 to 10.

FIG. 1 is a simplified illustration of an example environment 100 for automatic topic/content summarization, related to at least some embodiments disclosed herein. The example environment 100 includes a summarization engine 102 and a plurality of data sources 104 deployed within the environment 100. The summarization engine 102 communicates with the plurality of data sources 104 to gather information (e.g., topics, stories, documents, etc.) corresponding to products/brands, services, personalities, businesses, campaigns, and events, among others.

The summarization engine 102 is configured to summarize the information and deliver summarized content to relevant customers at predefined intervals in forms such as news feeds. The environment 100 includes one or more customers/users 116, 118, 120 and 122 and respective user devices 108, 110, 112 and 114. Without loss of generality, in an embodiment, the customers 116, 118, 120 and 122 may include PR, marketing and communication professionals associated with a brand, a product, an event or a famous personality, or personnel of any organization providing services such as sales, marketing, branding, PR services, advertisement services, etc. The summarized content may provide an understanding of public's sentiment towards the brand, the product, the event or the personality, to the PR, marketing and communication professionals.

In another embodiment, the customers 116, 118, 120 and 122 may also be general public who may have expressed interest in the brand, product, event or the personality on various media platforms. It shall be noted that the summarization engine 102 may be configured to select the customers (audiences) to whom the summarized content may be delivered, based on the type of stories and the type of association of the customers with the brand, products, events, campaigns etc., included in the stories.

The summarized content may be posted on profiles/accounts/pages associated with the users (e.g., users 116, 118, 120 and 122) across various media platforms (which may be the data sources 104). Alternatively or additionally, the summarized content may be shared privately to contact information such as email address and phone numbers (e.g., in form of text message) associated with the users (e.g., users 116, 118, 120 and 122). The summarized content may be received at the respective user devices (e.g., user devices 108, 110, 112 and 114) associated with the users (e.g., users 116, 118, 120 and 122) while the user devices are connected to the Internet.

In another embodiment, more than one summarization engines 102 may be deployed within the environment 100, wherein the summarization engines 102 may be hosted by a third party entity. Such a configuration may be implemented to reduce the load on a single summarization engine 102. This may also result in faster processing of information. In yet another embodiment, more than one summarization engines 102 may be deployed within the environment 100, wherein each summarization engine 102 may be hosted by an entity associated with a brand, product or service. The summarization engine 102 may be hosted at a remote server. Alternatively, the summarization engine 102 may be an example of a remote server. The remote server can be a cloud based server, or a physical server located at one or more geographical locations. The summarization engine/remote server is an example of a computer/computing system or a network of computers connected through a local or remote network and/or the Internet. The underlying software of the summarization engine are capable of running on a single computer, or in a distributed mode such as a network of computers connected through local or remote network and/or the Internet. In the distributed mode, the software may share and utilize all the resources together provided by all the computers in the network. Resource allocations and environments (CPU, memory, network bandwidth, storage) can be provided by dedicated computers connected in the network, or though resource management operating systems, virtual machines or hypervisors running on shared computers. This enables the summarization engine to work on either a self-managed or a cloud based infrastructure, consisting of either dedicated computers (all resource recognized and allocated to the software) or shared, restricted resources (the typical cloud provider case, where the summarization engine may have has restricted access to a limited subset of the resources.)

The summarization engine 102 includes a processor and a memory. The memory stores instructions which are executed by the processor to facilitate gathering information from the data sources 104. The information/story may include a piece of news, a tweet, a post etc., and the information corresponds to one or more brands, products, personalities, businesses, campaigns and events, among others. The processor may execute instructions to facilitate storing the information, processing the information to extract one or more themes or topics, finding representative stories and summarizing the information into desirable content (such as news feed) for delivering it to the relevant audiences (e.g., users 116, 118, 120 and 122).

The plurality of data sources 104 may include the World Wide Web (WWW), social networking platforms such as Facebook®, Twitter®, Quora®, Instagram®, etc., news broadcast, printed news, e-commerce platforms, talk shows and blogs, among others. Additionally, the plurality of data sources 104 may also include internal data sources, such as a PR, marketing or communications team associated with the brands/products, personalities, businesses, campaigns and events, among others, who may release information privately or through private forums.

The summarization engine 102 communicates with the plurality of data sources 104 through a communication network 106. The communication network 106 represents any distributed communication network (wired, wireless or otherwise) for data transmission and receipt between/among two or more points. The communication network 106 may as an example, include standard and/or cellular telephone lines, LAN or WAN links, broadband connections (ISDN, Frame Relay, ATM), wireless links, and so on. Preferably, the communication network 106 can carry TCP/IP protocol communications, and HTTP/HTTPS requests can be communicated over such communication networks 106. In some implementations, the communication network 106 includes various cellular data networks such as 2G, 3G, 4G, and others. Typical examples of the communication network 106 includes a wireless or wired Ethernet-based intranet, a local or wide-area network (LAN or WAN), and/or the global communications network known as the Internet, which may accommodate many different communications media and protocols.

The user devices 108, 110, 112 and 114 may be used for receiving content summarized by the summarization engine 102 among various other purposes. Examples of the user devices 108, 110, 112 and 114 may include, but are not limited to, mobile phones, tablets, notebooks, laptops, desktops and personal digital assistants (PDAs), among others. The user devices 108, 110, 112 and 114 may be configured with communication capabilities that enable communication with the data sources 104 including the World Wide Web.

As described earlier, the users (e.g., users 116, 118, 120 and 122) are associated with one or more brands/products as PR, marketing, communication professionals. Information corresponding to the users associated with one or more brands/products may be received from sources, such as a company/brand of which the users may be employees. Further, information corresponding to the users associated with one or more brands/products may be received from the users themselves. Furthermore, information corresponding to the users associated with one or more brands/products may be received from their social networking profiles (e.g., LinkedIn®, Facebook®, Twitter®, etc).

Additionally, the users (e.g., users 116, 118, 120 and 122) include a portion of the public population who may have expressed interest in one or more particular brands/products while browsing the Internet. These users may have logged in on various websites and platforms on the Internet with their social networking profiles. The browsing patterns of the users may be received at the summarization engine 102 along with the users' specific information including gender, age, contact details, interests, hobbies, likes and dislikes, activities (social media posts and tweets) across various platforms (e.g., data sources 104), and sentiments towards a products/brand, among others etc. The interest of the users may be determined from their activities and browsing patterns by the summarization engine 102.

Based on information corresponding to the users (e.g., users 116, 118, 120 and 122), relevant summarized content may be generated. Summarized content may be an aggregate or a summary (e.g., news feed, news headline, etc.) of all stories classified or clustered belonging to a particular topic.

In an embodiment, the summarization engine 102 may deliver summarized content to relevant audience. The relevant audience may include customers/users closely associated with a brand, a product, a campaign, an event, or a personality. The relevant audience may include a PR, marketing or a communications professional. Additionally or alternatively, the relevant audience may include a portion of the public population who may have expressed interest in one or more particular brands/products while browsing the Internet. The summarization engine 102 may filter the relevant audience from all other users in the user database 208. Content may be shared on social media platforms at the contact information associated with the relevant audience. Additionally or alternatively, content may be shared privately with the relevant audience on the email addresses associated with the relevant audiences and through private forums of which the target audience may be a member. Subsequently, the relevant audience may use the summarized content to analyze the public's sentiments towards the product/brand and thereby develop strategies to shape/re-shape public's perception of the brand/product.

Figure 2:
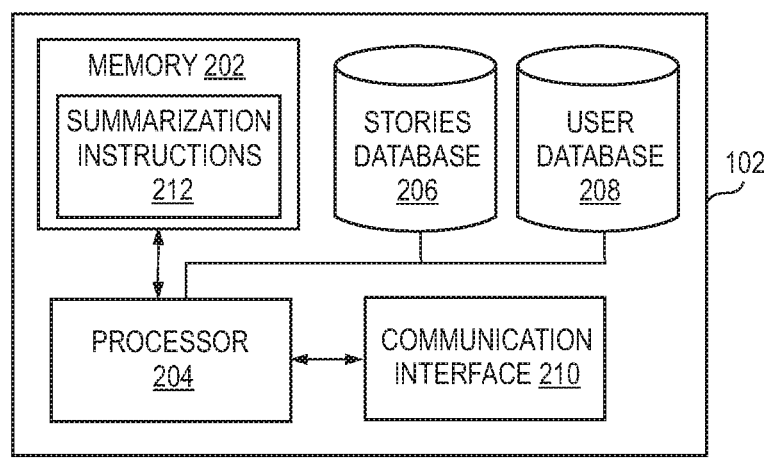
FIG. 2 is a simplified block diagram of the summarization engine, in accordance with some embodiments.

FIG. 2 is simplified block diagram of the summarization engine 102, in accordance with some embodiments of the disclosure. The summarization engine 102 includes a memory 202, a processor 204, a stories database 206, a user database 208 and a communication interface 210. As described earlier, the memory 202 may include codes/instructions that are executed by the processor 204. Among all other instructions, the memory 202 includes algorithms (e.g., summarization instructions 212) which are to be run by the processor 204 for topic detection and finding representative stories. Examples of algorithms may include, but are not limited to, Latent Dirichlet Allocation (LDA) algorithm and Restricted Bolzmann Machine (RBM) algorithm. As may be well known in art, the LDA algorithms are generally used in topic modeling and document clustering and the RBM algorithms are widely used in dimensionality reduction, classification, collaborative filtering, feature learning and topic modeling.

The stories database 206 may store stories/information/content relevant to various brands/products, services, businesses, events, etc., received from the data sources 104. The summarization engine 102 may receive a volume of stories from the plurality of data sources 104 at predefined intervals. The volume of stories may relate to one or many brands, products, services, businesses, events and personalities, among others. It shall be noted that, for the purposes of this description, each media item (e.g., post, tweet, a piece of news, etc.) is considered a story.

In another embodiment, where, more than one summarization engines 102 are deployed and each summarization engine 102 is hosted by an entity associated with a brand, the summarization engine 102 may retrieve stories only relevant to the particular brand from the plurality of data sources 104. The summarization engine 102 may be capable of differentiating stories relevant to one particular brand from other stories based on keywords included in the stories, which is performed using the LDA algorithm(s).

The user database 208 stores data corresponding to customers (e.g., users 116, 118, 120 and 122) across the globe. The user database 208 may store professional profile information corresponding to users, such as a PR professional. The user database 208 also stores information associated with social media profiles such as Facebook® and/or Twitter® profiles associated with the users. Data corresponding to a user may include details related to a brand with which the user is associated, the user's employer, gender, age, interests, hobbies, likes and dislikes, activities derived from various data sources (104), and user's sentiments towards a products/brand, among others.

The communication interface 210 enables the summarization engine 102 to use the communication network 106 to communicate with the plurality of data sources 104.

Figure 3:
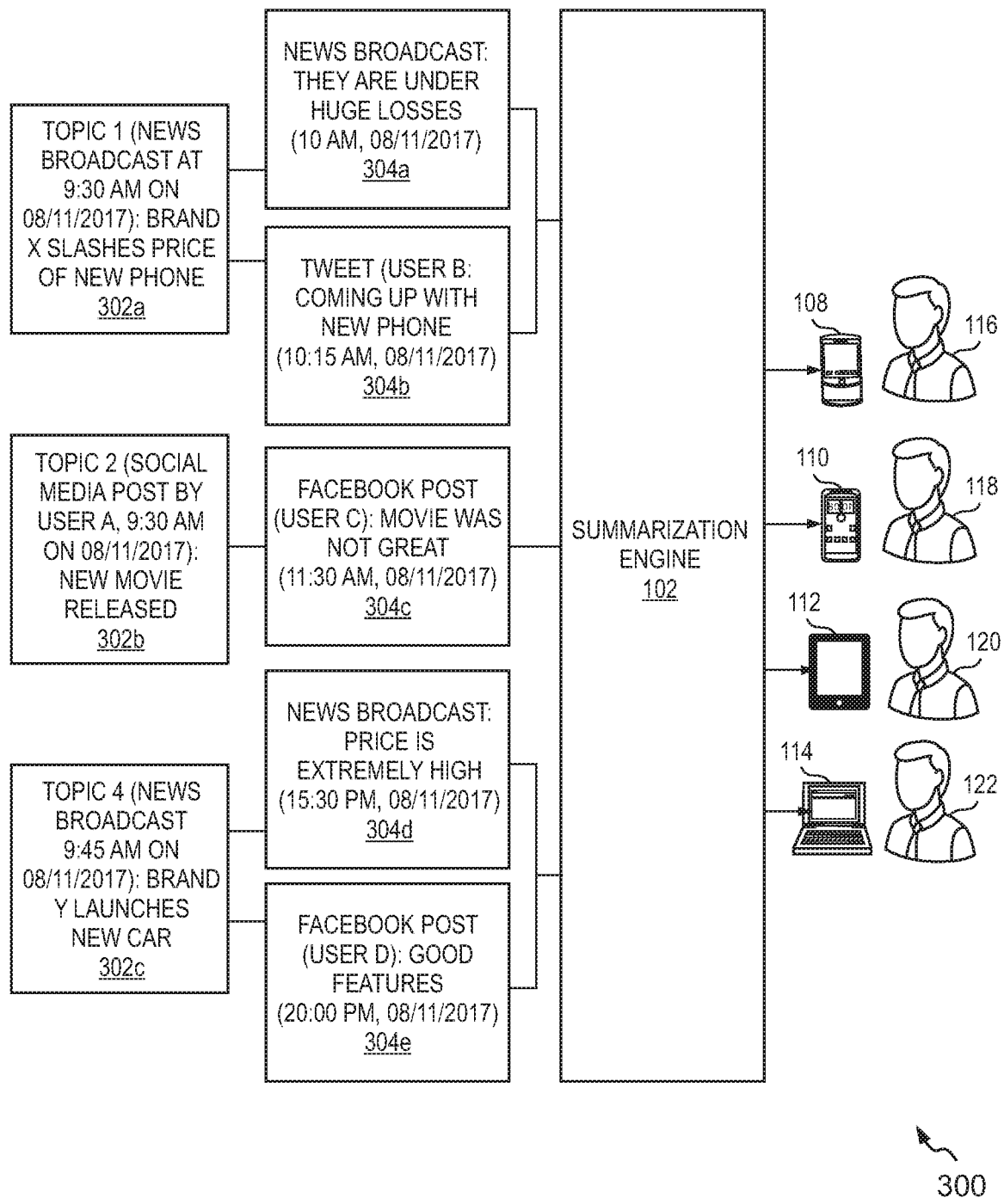
FIG. 3 is an example representation of automatic topic/content summarization, in accordance with an example embodiment.

FIG. 3 is an example representation of automatic content summarization in accordance with some embodiments disclosed herein. Blocks 302a, 302b and 302c are representations of three topics or stories. The story represented by the block 302a relates to a brand "X" dealing with manufacturing or distribution of mobile phones. In the illustrated example, the story represented by the block 302a corresponds to the brand "X" that has reduced the price of a new mobile phone. The story represented by the block 302b relates to the release of a new movie. The story represented by block 302c relates to a brand "Y" who may deal with manufacture or distribution of automobiles. The story represented by block 302c corresponds to brand "Y" launching a new car.

As seen in FIG. 3, the story represented by the block 302a may be published for the first time at 9.30 am on Aug. 11, 2017 in a news broadcast. The data source 104 in this scenario is a first news broadcasting platform/server. The story represented by the block 302*b* may be published in a social media post at 9.30 am on Aug. 11, 2017 by "user A". The data source 104 in this scenario is a social media platform. Similarly, the story represented by the block 302*c* may be published for the first time at 9.45 am on Aug. 11, 2017 in a news broadcast. The data source 104 in this scenario is a second news broadcasting platform/server. In each of the scenarios, the stories may be published on the data sources 104 by one or more users or internal sources such as PR teams associated with the brand X and the brand Y.

The stories represented by the blocks 302*a*, 302*b* and 302*c* may have transitioned and escalated into various other platforms in due course of time as seen in FIG. 3. The blocks 304*a*, 304*b*, 304*c*, 304*d* and 304*e* represent new stories related to the stories 302*a*, 302*b* and 302*c*. As an example, in a news broadcast of 10:00 am, new news (e.g., "They are under huge losses") related to the story represented by the block 302*a* may be published at 10 am on Aug. 11, 2017 (block 304*a*). Similarly, a new tweet (e.g., "Coming up with new phone"), related to the story represented by the block 302*a* may be published at 10:15 am on Aug. 11, 2017 (block 304*b*). Likewise, a new Facebook post (e.g., "Movie was not great") may be published by user C at 11:30 am on Aug. 11, 2017 (block 304*c*) related to the story represented by the block 302*b* on a user B's Facebook page. Similarly, news broadcast (e.g., "Price is extremely high") related to the story represented by the block 302*c* may be published at 15:30 pm on Aug. 11, 2017 (block 304*d*). Further, a new Facebook post (e.g. "Good features"), related to the story represented by the block 302*c* may be published at 20:00 pm on Aug. 11, 2017 (block 304*e*). The stories represented by the blocks 302*a*, 302*b*, 302*c* and new stories represented by the blocks 304*a*, 304*b*, 304*c*, 304*d* and 304*e* relate to three individual topics. All of these stories may be received by the summarization engine 102 at predefined intervals (e.g. as soon as these stories are published).

The summarization engine 102 performs the process of automatic summarization of the stories based on the textual content of the stories. The summarization engine 102 plots the stories over time (e.g., at the predefined intervals), which may be relevant to one or more users (e.g., users 116, 118, 120 and 122 and users A, B, C and D). The summarization engine 102 may find peaks in the plot of these stories versus time (see FIG. 5). The processor 204 may determine the key people (e.g., users A, B, C and D) who posted stories in these peaks. The processor 204 determines the key topics of the stories in the peaks by applying the LDA algorithm. Further, the processor 204 extracts stories, based on the topic(s) of the stories, from the one or more peaks to find a set of stories that are representative examples of the stories.

Subsequently, the stories are summarized in form of news feed or content and delivered to the one or more users (e.g., users 116, 118, 120 and 122). As an example, the one or more users who may be receiving summarized content corresponding to the story represented by the block 302*a* may include the PR or marketing professionals associated with the brand "X" and the user 116. Similarly, the PR or marketing professionals associated with the movie and the user 118 may receive summarized content corresponding to the story represented by the block 302*b*. Similarly, the user 120 and the PR or marketing professionals associated with the brand Y may receive summarized content corresponding to the story represented by the block 302*c*. Additionally, the stories are delivered to the one or more users (e.g., users A, B, C and D) who are responsible for publishing these stories on various data sources 104. As an example, summarized content corresponding to the story represented by the block 302*a* may be delivered to the user B, summarized content corresponding to the story represented by the block 302*b* may be delivered to the user A and the user B and summarized content corresponding to the story represented by the block 302*c* may be delivered to the user D.

Figure 4:
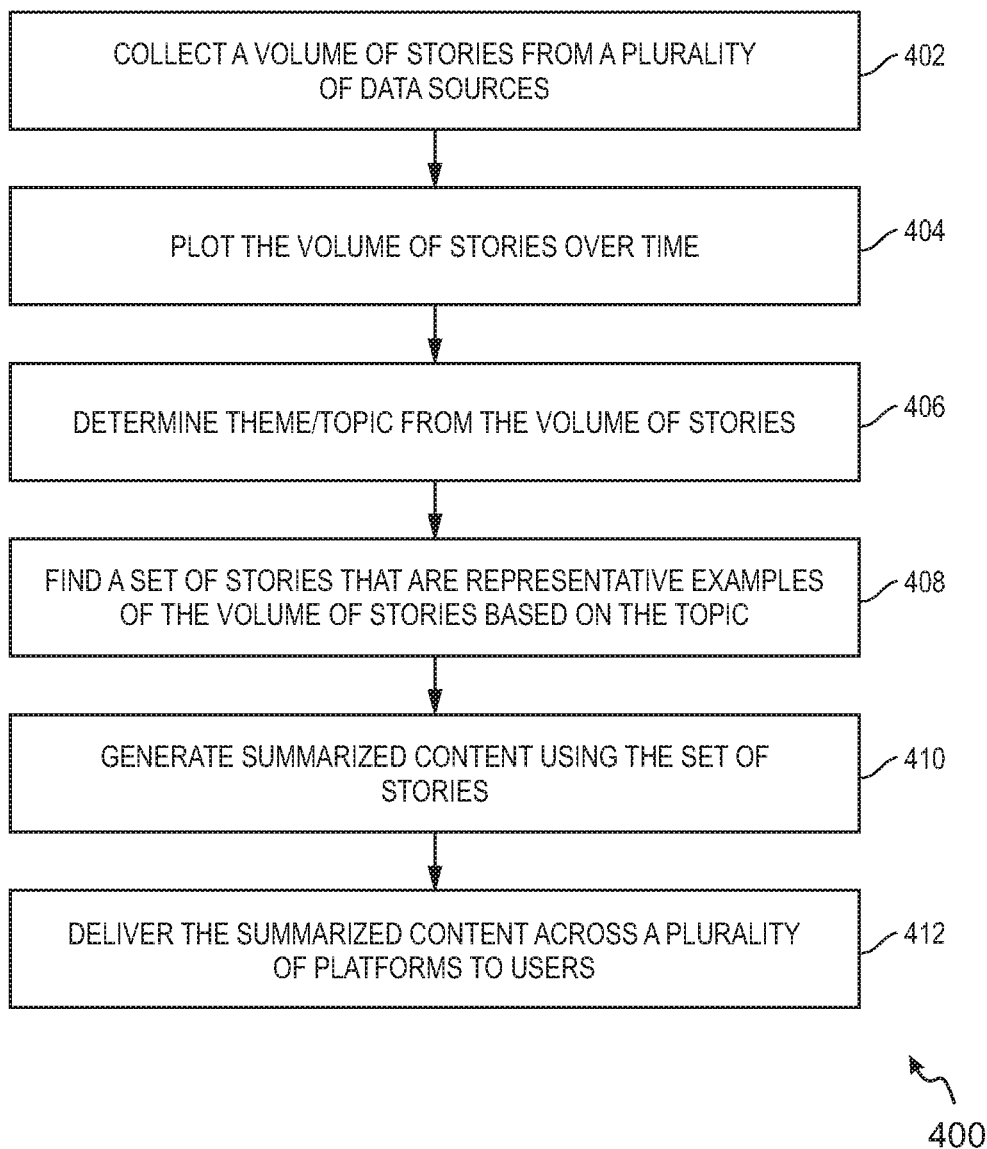
FIG. 4 is a flowchart illustrating a method of automatic topic summarization, in accordance with an example embodiment.

Referring to FIG. 4, a flowchart illustrates a method 400 for automatic topic/theme summarization, in accordance with an embodiment of present disclosure. One or more operations of the method 400 are carried out by the summarization engine 102. The sequence of operations of the method 400 may not be necessarily executed in the same order as they are presented. Further, one or more operations may be grouped together and performed in form of a single step, or one operation may have several sub-steps that may be performed in parallel or in sequential manner.

At operation 402, the summarization engine 102 collects a volume of stories (e.g., a large collection of stories) from a plurality of data sources 104. The volume of stories may include media items such as piece of new articles, tweets, social media posts, blog articles or speeches given at public or private platforms. The data sources 104 may be social networking platforms, such as Facebook® and/or Twitter®, newspapers, news broadcasting platforms, ecommerce websites, blogs and articles, talk shows, etc.

In another embodiment, the summarization engine 102 may be configured to collect various stories from the plurality of data sources 104, which are specific to users, such as common audience, audiences closely associated with a brand (PR manager of a brand). In yet another embodiment, the summarization engine 102 may be configured to collect stories, which are specific to one or more brands. In yet another embodiment, the summarization engine 102 may be configured to collect stories, which are specific to a particular product or one or more products.

The stories may be collected over predefined intervals of time by the summarization engine 102. The predefined interval may, as an example, be 5 minutes, 15 minutes, 30 minutes, 1 hour, 1 day, etc. The summarization engine 102 may constantly analyze the content of stories collected at the predefined intervals. The summarization engine 102 stores the stories in the stories database 206.

At operation 404, the processor 204 executes instructions to plot the volume of stories over time (e.g., the predefined intervals). The processor 204 may be configured to find peaks in the plot of the volume (i.e. number) of stories vs. time (see FIG. 5). From the plot, the temporal extent (e.g., start, end) of the peaks are determined. The processor 204 may determine the key people who posted stories in this peak. The processor 204 determines the key topics of the stories in this peak by applying the LDA algorithm. Further, the processor 204 extracts posts from individual peaks that are representative of the stories in these peaks. Plotting the volume of stories relevant to an audience over time and finding peaks in the plot of the volume of these stories vs. time is described in details in reference to FIG. 5.

At operation 406, the summarization engine 102 detects themes/topics from the stories. Each topic may be associated with a brand, a product, a person, an event or a service, etc. The summarization engine 102 tokenizes each story into a token vector and each token vector is treated as a separate document (story). LDA algorithm is applied onto each of these groups of tokens to determine the topic(s)/theme(s) of the stories. Similarity between these clusters is then determined. Themes, which have met a pre-defined similarity threshold, are then potentially collapsed/merged based on the determination. The topic/theme detected from a story may be specific to a brand or a product.

At operation 408, the summarization engine 102 finds a set of stories that are representative examples of the stories based on the topic. RBM algorithm is widely used in dimensionality reduction, classification, collaborative filtering, feature learning and topic modeling. The set of stories in a peak (see Peak1 and Peak 2 in FIG. 5) may be trained using RBM models to extract a few stories that are the most representative of stories from a given set of stories. The Restricted Boltzmann Machines are used as devices to create a richer representation of each story, a representation amenable to clustering with respect to the meaning of the story instead of clustering with respect to the text of the story.

At operation 410, the summarization engine 102 generates summarized content from the set of stories. Upon detecting the topics and finding the representative stories, the summarization engine 102 may use the users' data from the user database 208 to generate content relevant to the specific users. Summarized content may be the aggregate of all the representative stories categorized under a particular topic. Summarized content, in this case may be news feeds, news headlines, news snippets, advertisements with offers, etc.

At operation 412, the summarization engine 102 delivers the summarized content to relevant users. The summarized content may be either published on a social networking profile/page of a user (e.g., user 116), such as Facebook®, Twitter®, etc. Additionally, the summarized content may be sent to contact information, such as email address and phone numbers (as text message) associated with the users (e.g., users 116, 118, 120 and 122). The summarized content may be presented to one or more users based on information corresponding to the user that may be accessed from the user database 208. For example, a user (e.g., user 116) may be the head of marketing associated with a brand X. The summarization engine 102 delivers summarized content including topics such as the news update, social media posts corresponding to brand X to the user 116. Similar content may also be delivered to another user (e.g., user 118) who may be interested in brand X and may have purchased one of their products.

In one or more embodiments of the present disclosure, summarized content may be delivered to relevant audience, wherein the relevant audience may include people closely associated with a brand, a product, a campaign, an event or a personality. The relevant audience may include a brand's PR, marketing or communication professionals. The summarization engine 102 may filter such users from the user database 208 from all other users. Content may be shared privately with the relevant audience on the email addresses associated with the relevant audience and any private forums associated with the relevant audience.

The processor 204 may execute instructions as to how frequently or at what intervals should summarized content be delivered to target users. The processor 204 may be configured to publish or deliver summarized content (news feed) at predefined intervals for example, 15 minutes, 30 minutes, 1 hour, 2 hours, etc., to target users.

In an embodiment, the summarization engine 102 may facilitate early warning or detection of rapid changes in the volume of stories over time on various, real-time streaming platforms (data sources 104) like Twitter®. The processor 204 of the summarization engine 102 may utilize a distributed, real-time data processing pipeline e.g. Apache Storm to determine the change.

Figure 5:
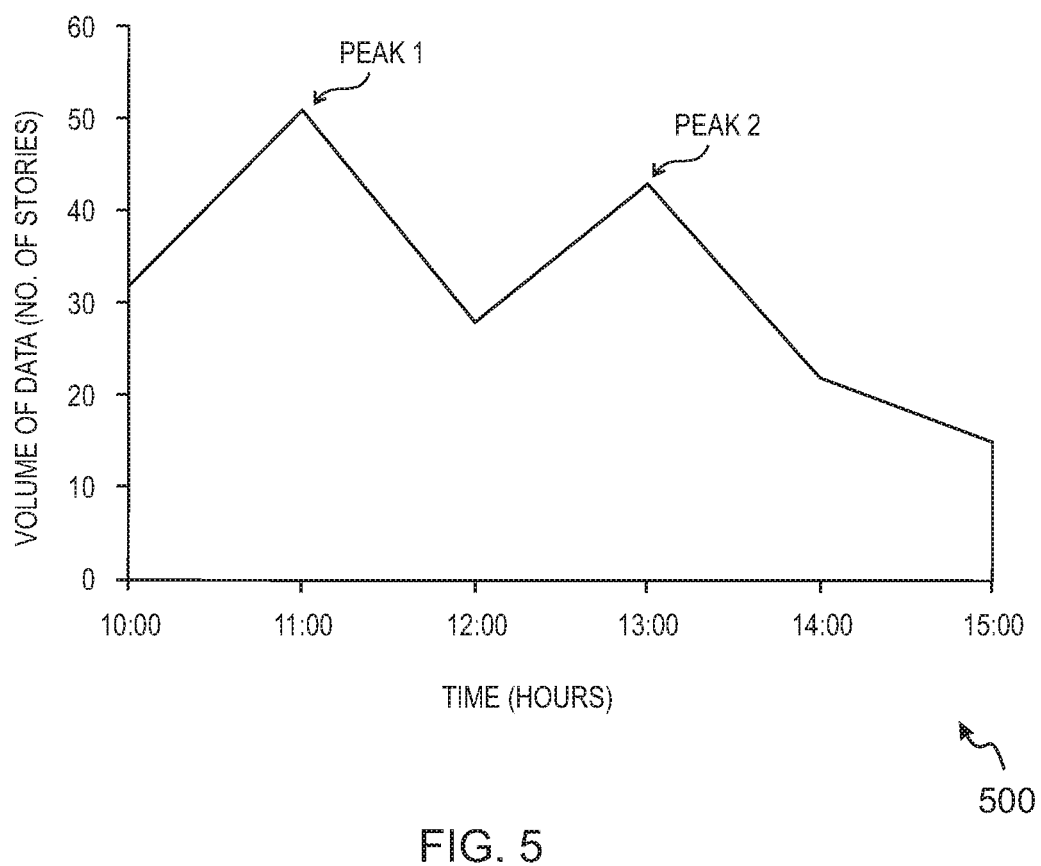
FIG. 5 is a representation of a plot of volume of stories against time, in accordance with an example embodiment.

FIG. 5 is a representation of a plot 500 of the volume of stories versus time. The plot 500 may facilitate early warning or detection of rapid changes in the volume of stories over time. The plot 500 displays the time data (in hours) in the X-axis and the volume of stories in the Y-axis. In the time axis, the interval between two time data (e.g. 10:00 hours-11:00 hours) may be defined as time bucket. Typically, the size of a time bucket can be, but not limited to, 1 minute, 15 minutes or an hour. As an example, in FIG. 5, a time bucket of size 1 hour is shown. Each time bucket covers the same period of time e.g. 1 hour in FIG. 5. The size of a bucket determines how sensitive and reactive the early detection is. The length of the whole time period is typically defined by the number of the buckets. In this case, the number of time buckets typically range between 12 and 96 buckets. The summarization engine 102 applies a combination of statistical algorithms to determine the rapid volume change in the time series data.

The summarization engine 102 implements a peak detection algorithm to find peaks in the plot of FIG. 5. The peak detection algorithm automatically marks unusual spikes (see Peak 1 and Peak 2 in FIG. 5) in the time series data based on a predefined time period (e.g. 10:00 hours-15:00 hours in FIG. 5). The peak detection algorithm uses historical data points. In addition to the selected time period, the peak detection algorithm uses a configurable number of data points of the same time of the day from previous days, workdays or weeks. For example, to determine peaks on an hourly chart (1-hour buckets) for the day of Nov. 8, 2017 for the data point with stories between 1 pm and 2 pm, the peak detection algorithm, configured for weekly look back, would fetch data from Nov. 1, 2017 with stories between 1 pm and 2 pm, and from Oct. 25, 2017 in the same hour, and so on. The number of historical data points is configurable. As an example, the peak detection algorithm may use weekly look backs over an hourly chart and goes back 4 or 5 weeks in history.

In an embodiment, the peak detector algorithm applies a combination of minimum, maximum, second maximum, percentile, and standard deviation over the historical data points to determine whether the actual volume of stories for a day at a given time period is out of an expected or usual range, called an outlier. The outliers of the data points may be used for determination of topics and finding of representative stories.

The peak detector algorithm or an outlier detector algorithm determines the story volume interval what is considered normal or expected for that hour of the day. As an example, the algorithm determines that the normal media/story volume between 9 am and 10 am is between 100 and 150 stories (referred as the expected range). If one day, the actual volume for the same period is 115, then it will be considered as within the expected range, and it is an ordinary media traffic for that customer profile (brand/product/company). If between 9 am and 10 am, the volume goes up to 180, an outlier is detected, and it indicates that something important is happening in the media for that profile. Similarly, if there are only 35 stories between 9 am and 10 am, it indicates an outlier as well (although not a peak).

Figure 6:
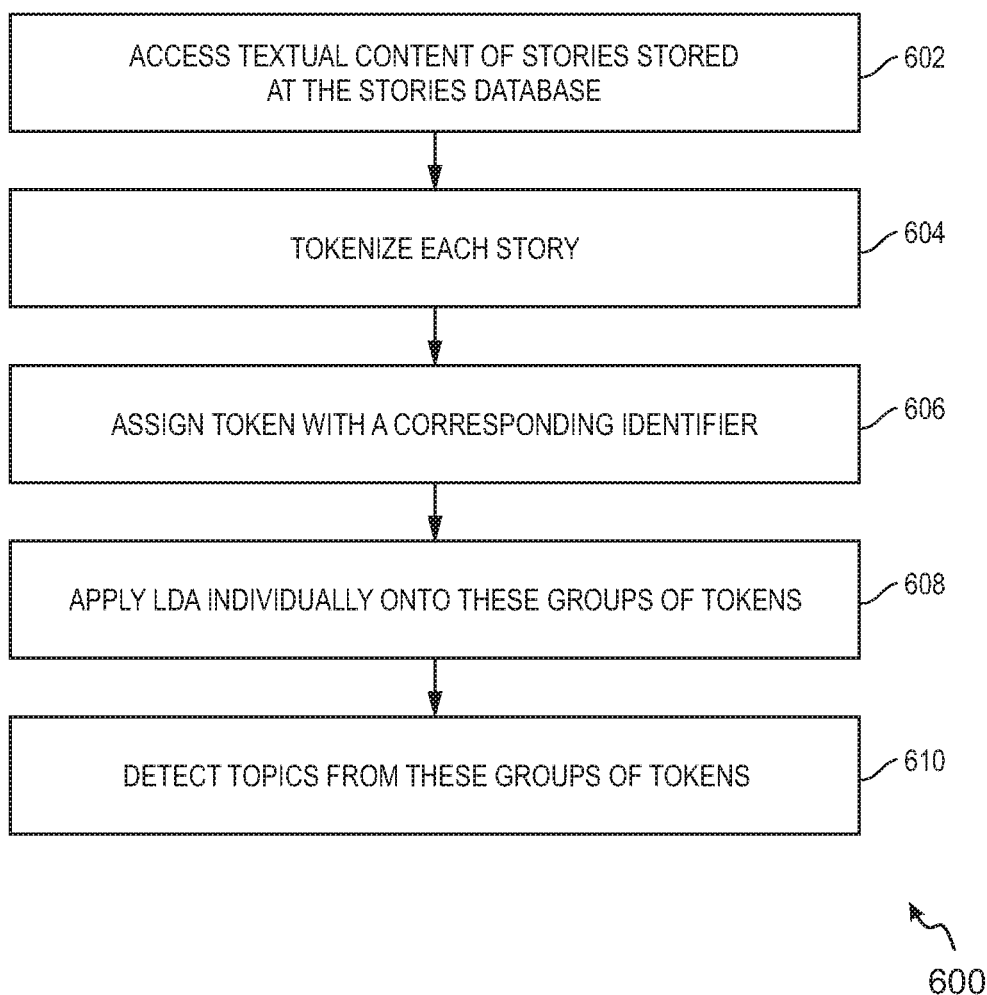
FIG. 6 is a flowchart illustrating a method of topic/theme detection by the summarization engine, in accordance with an example embodiment.

Referring to FIG. 6, a flowchart illustrates a method 600 for determining a topic/theme in the volume of stories, in accordance with an example embodiment. One or more operations of the method 600 are carried out by the summarization engine 102. The sequence of operations of the method 600 need not be necessarily executed in the same order as they are presented. Further, one or more operations may be grouped together and performed in form of a single step, or one operation may have several sub-steps that may be performed in parallel or in sequential manner.

At operation 602, the summarization engine 102 accesses the textual content of the stories stored at the stories database 206. It shall be noted that the stories processed (used/involved) are the stories that are included in the peaks (Peak 1 and Peak 2) as seen in FIG. 5.

At operation 604, the processor 204 of the summarization engine 102 tokenizes each story into token vectors. Each story may be a media item (e.g. an article headline, a post, a tweet, an article body, etc.). Tokenization of stories includes removing extraneous "html" characters, special characters such as "&", "#" etc., punctuations and stop words, from the story/piece of information creating a vector of words from the remaining tokens. Further, the processor 204 can be configured to perform a part of speech (PoS) analysis of the stories. Words/texts belonging to the PoS may be passed to the RBM for training. Each token vector is treated as a separate document.

At operation 606, the processor 204 assigns each token with a corresponding identifier. The identifier may be pre-programmed into the summarization engine 102. The identifier herein represents a profile identifier (profile-id). The profile is the segment of the media which a user would like to follow. More specifically, a profile is defined by a taxonomy—a textual Boolean expression. Each users/account may have many profiles. All stories are grouped with profile-ids. Each profile gets separated and each of them will have all their stories assigned to them. This separation is required to generate results per profile and to properly assign the result set to the appropriate profile. Profile-ids mark the story ownership, and each story may belong to multiple profiles.

At operation 608, LDA algorithm is applied individually onto each of these groups of token vectors. The processor 204 uses the LDA algorithm with online variational Bayes updating as set forth in a paper titled "*Latent Dirichlet Allocation*" authored by David M. Blei, Andrew Y. Ng, Michael I. Jordan; Journal of Machine Learning Research issued on 3(January):993-1022, 2003.

The LDA algorithm is based on an assumption that documents are comprised of a mixture of topics. A topic is defined as a token-probability vector. For example, the documents may include topics that can be classified as "Plant" and "Animal". The LDA algorithm is applied to the documents that include these topics. As a result of application of LDA, one or more word vectors (where each word is a combination of the token and probability of that token given the generated topic) are produced. Using the "Plant" example, the resultant word vector (token, probability) might have such tokens as (plant, 0.80), (leaf, 0.65), (green, 0.440, (branch, 0.35), (soil, 0.25), (root, 0.10), etc. Taking the example further, another word vector might have tokens such as "dog", "tail", "mammal", "cat", "pet", "meow", etc. This word vector may be classified as the "Animal" topic. It shall be noted that the LDA algorithm is iteratively applied onto these groups of tokens until topic(s) can be clearly determined. At operation 610, the processor 204 detects the topics from these groups of tokens. The LDA algorithm clusters the themes/topics from the tokens into one or more clusters or categories. Similarity between these clusters is then determined using one or a variety of similarity metrics, including, but not limited to, Jaccard Similarity and/or Cosine Similarity based off of the tokens contained within each cluster. Themes, which have met a pre-defined similarity threshold, are then potentially collapsed/merged based on the determination.

Figure 7:
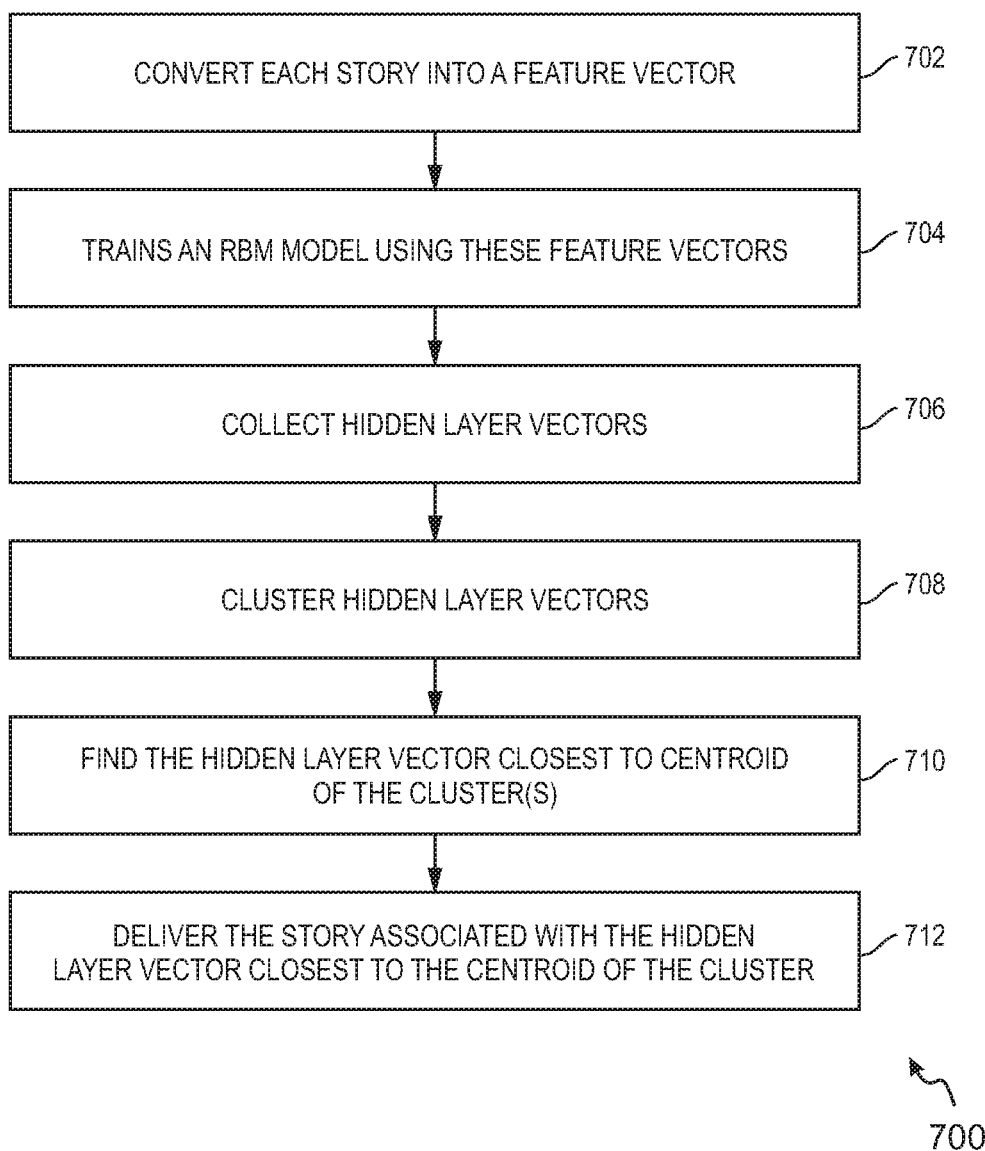
FIG. 7 is a flowchart illustrating a method of finding a set of stories that are representative examples of the volume of stories, in accordance with an example embodiment.

Referring to FIG. 7, a flowchart illustrates a method 700 for finding a set of stories which are example representation of the stories using RBM algorithm, in accordance with an embodiment. One or more operations of the method 700 are carried out at the summarization engine 102. The sequence of operations of the method 700 need not be necessarily executed in the same order as they are presented. Further, one or more operations may be grouped together and performed in form of a single step, or one operation may have several sub-steps that may be performed in parallel or in sequential manner.

Given a set of thousands of stories in a peak of volume of stories versus time plot, the aim is to be able to extract a few stories that are the most representative of the stories in the peak. One aspect of finding the most representative stories are set forth in a paper titled "*Training products of experts by minimizing contrastive divergence*", authored by Hinton, G. E., published in August 2002 with Neural Computation issue 14(8):1711-1800.

At operation 702, the summarization engine 102 converts each story into a feature vector. It shall be noted that the stories in this case are those stories that are in the peaks (e.g., Peak 1 and Peak 2) as seen in FIG. 5. It is noted that the RBMs operate on vectors of real numbers (e.g. floats or doubles), so in order to apply RBM on texts, the text must be converted to a vector of real numbers. The individual elements of the vectors that represent a piece of text are called features, hence the entire vector is called a feature vector. Each element of the feature vector represents a feature from the text. In particular, the features are words or pair of words (bi-grams). The individual tokens of each story are converted into numeric representations. For example, for a given (N×M) matrix in which the columns are tokens and the indexed rows are the stories, the feature vector may look like <0, 1, 1, 0, 0, . . . , 1,0> where 0 represents the absence of the $m_i$-th token and 1 represents its presence.

There are multiple techniques for creating a feature vector from text. One example technique is to set each element of the feature vector to represent a word or phrase. The value of that element in the feature vector can be set to, for example, the number of times that word or phrase appears in the text, a number (e.g. 0 or 1) that simply indicates whether that word or phrase exists in the text, etc. Like most neural networks, RBMs have a layer of visible units (or visible layer) and a layer of hidden units (or hidden layer) and a fully connected matrix of weights connecting the visible and hidden layers. As in any neural network model, to train and run the RBM, the feature vector is copied to the units in the input, or visible layer.

At operation 704, the processor 204 of the summarization engine 102 trains RBM models using these feature vectors. During training, activation on the hidden unit feature vectors are computed given an input (visible) feature vector. Similarly, the hidden layer feature vector can be used to compute the activation on the visible layer. This training takes an input matrix V comprised of the stories converted into the feature vectors. The matrix maximizes product of probabilities assigned to these feature vectors according to equation given below.

$$\mathrm{argmax}(W) \prod_{v \in V} P(v)$$

After training, the hidden layer forms a representation of the feature vectors that captures its underlying meaning.

Information corresponding to counts of all words and bi-grams in all of the posts, the weights of the trained RBM and the hidden unit feature vectors, are stored in a directory.

At operation 706, the processor 204 collects the hidden layer representations of the feature vectors. At operation 708, the hidden layer feature vector representations are clustered. Clustering enables finding posts that are similar in an underlying semantic sense.

At operation 710, the processor 204 finds the hidden layer feature vector closest to a centroid of the cluster. It is determined whether the cluster is good enough to use or if it contains enough posts or if it is compact. If it is determined that the cluster is good enough, the hidden layer feature vector in that cluster that is closest to the centroid of the cluster is found. Further, a post identifier (post ID) of the post that generated that hidden layer feature vector is noted.

At operation 712, the processor 204 delivers the story (feature vector) associated with the hidden layer closest to the centroid of the cluster.

Figure 8:
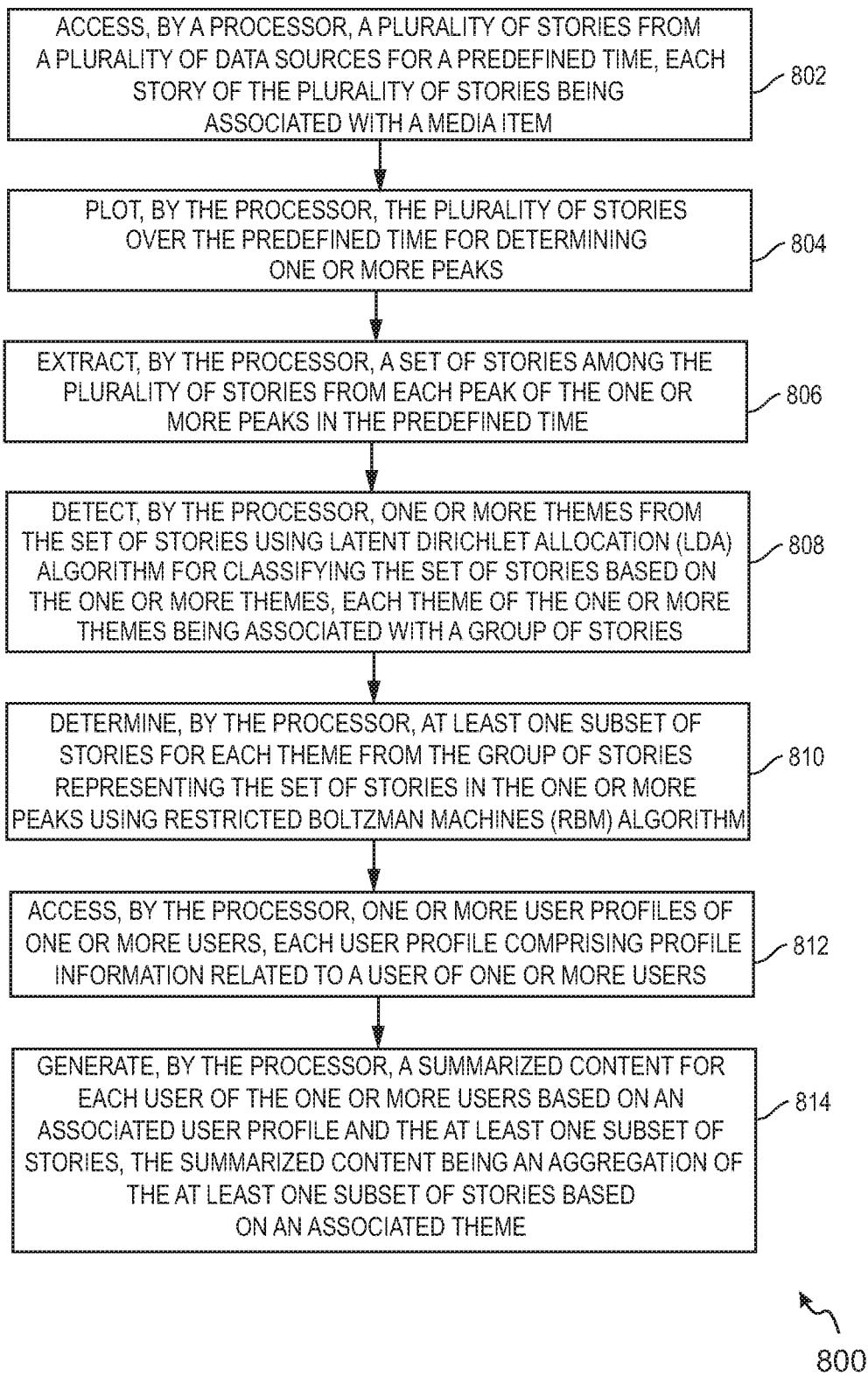
FIG. 8 is a flowchart illustrating a method for automatic summarization of media content, in accordance with an embodiment.

Referring to FIG. 8, a flowchart illustrates a method 800 for automatic summarization of media content, in accordance with an embodiment. One or more operations of the method 800 are carried out at the summarization engine 102. The sequence of operations of the method 800 need not be necessarily executed in the same order as they are presented. Further, one or more operations may be grouped together and performed in form of a single step, or one operation may have several sub-steps that may be performed in parallel or in sequential manner.

At operation 802, the method 800 includes accessing, by a processor, a plurality of stories from a plurality of data sources for a predefined time. The story may be related to at least one of a brand, a product, a person, an event, and a service. Examples of the plurality of data sources include but not limited to a social networking platform, a newspaper, a news broadcasting, an e-commerce website, a blog, a magazine, and a talk show. Each story of the plurality of stories is associated with a media item. Examples of the media item include but not limited to a news article, a television broadcast, a social media post, a blog article, and a speech given at public or private platform.

At operation 804, the method 800 includes plotting, by the processor, the plurality of stories over the predefined time for determining one or more peaks. The plot displays the time data (in hours) in the X-axis and volume of stories associated with the plurality of stories in the Y-axis. The processor employs a peak detection algorithm to determine one or more peaks in the plot for the predefined time. Moreover, the peak detection algorithm accesses historical data points from a historical set of data points for the predefined interval. For example, 'n' number of data points of the same time from previous days, workdays, weeks or public holidays may be act as the historical set of data points and a data points of interest from the historical set of data points that may be areas of interest to determine a trend may be used as the historical data points. In an embodiment, an outlier is determined in the plot if at least one peak of the one or more peaks exceed a threshold value, for example, exceeds a maximum, a minimum or a standard deviation. In an example, the at least one story from the outlier is used for determining a theme associated with the at least one story in the outlier. More specifically, stories in the peak that lie outside the threshold value may be analyzed to determine the theme associated with stories. Determining the one or more peaks in the plot has been explained with an example plot shown in FIG. 5.

At operation 806, the method 800 includes extracting, by the processor, a set of stories among the plurality of stories from each peak of the one or more peaks in the predefined time.

At operation 808, the method 800 includes detecting, by the processor, one or more themes from the set of stories using Latent Dirichlet Allocation (LDA) algorithm for classifying the set of stories based on the one or more themes. The textual content of the set of stories is accessed and converted to a token vector (tokenization). Each of the token vectors are assigned an identifier and LDA algorithm known in the art may be employed to determine the one or more themes associated with the set of stories. Each theme of the one or more theme being associated with a group of stories. For example, the processor performs classification so as to combine stories of the set of stories with a same theme as a group of stories. In at least one example embodiment, each theme determined using the LDA algorithm is compared with other themes, for example, two themes at a time to determine a similarity value. In such cases, a set of similarity values ate obtained by comparing each theme of the one or more themes with remaining themes. Whenever, the processor determines a similarity value between a two or more themes greater than a similarity threshold value, the two or more themes are merged together so as to combine the stories associated with the themes. More specifically, such merging indicates that the themes and hence the stories associated with the themes are related. Alternatively, two or more themes are retained when the similarity value is lesser than the similarity threshold value. Determining themes from the set of stories in the peaks has been explained in detail with reference to FIG. 6.

At operation 810, the method 800 includes determining, by the processor, at least one subset of stories for each theme from the group of stories representing the set of stories in the one or more peaks using RBM algorithm. In an embodiment, the group of stories associated with each theme is converted into a set of feature vectors. One or more techniques known in the art are used for converting the textual content of each story of the group of story into a feature vector. Accordingly, each story of the group of stories is associated with a feature vector of the set of feature vectors. The feature vectors of each story are used to train RBM models. The RBM models are neural networks that include at least an input/visible layer, a hidden layer and an output layer. After training, the hidden layer values (also referred to as 'hidden layer representation') provide an approximation of the feature vectors. The hidden layer representation of the feature vectors of the each story of the group of stories are combined together to provide a first set of data. The first set of data is clustered into one or more clusters so as to form one or more subset of stories. More specifically, the first set of data is classified into one or more clusters so as to determine at least one cluster including a subset of stories representative of the set of stories in the one or more peaks of the plot. The one or more clusters are analyzed to determine a suitable cluster. For example, clusters that have enough stories or feature rich clusters may be selected as a representative of the one or more stories in the one or more peaks. Further, a centroid of the selected cluster is determined and at least one feature vector closest to the centroid is selected by the processor. The feature vectors closest to the centroid correspond to stories representative of the set of stories in the one or more peaks in the plot. Thereafter, the story/stories associated with the feature vector are merged together and/or delivered to the user. More specifically, the story/stories may be summarized to generate the summarized content as explained at operation 814.

At operation 812, the method 800 includes accessing, by the processor, one or more user profiles of one or more users. Each user profile includes profile information related to a user. In an embodiment, relevant audience/target audience for summarized content of a story may be determined and profiles of target audience may be accessed to customize the summarized content for each user. For example, based on a browsing pattern of a customer who follows brand 'X', certain attributes such as gender, age, profession, interests may be mined or collected from the user and the plurality of stories may be summarized based on the attributes. Alternatively, the relevant audience may include a brand's PR, marketing or communication professionals. Accordingly, the social or professional profile of the relevant audience may be tapped to collect user profile information prior to presenting the summarized content.

At operation 814, the method 800 includes generating, by the processor, a summarized content for each user of the one or more users based on an associated user profile and the at least one subset of stories. The summarized content is an aggregation of the at least one subset of stories based on an associated theme. In some example embodiments, the summarized content is published or provided to each user of the one or more users at a predefined interval based on a mode of communication. The mode of communication may be a text message, an email, a social media post and the like. The user may select a mode of communication for receiving the summarized content. For example, the user may follow a brand (e.g., Brand 'X') and may provide a contact number for receiving regular text message updates on release of products/news related to the Brand 'X".

Figure 9:
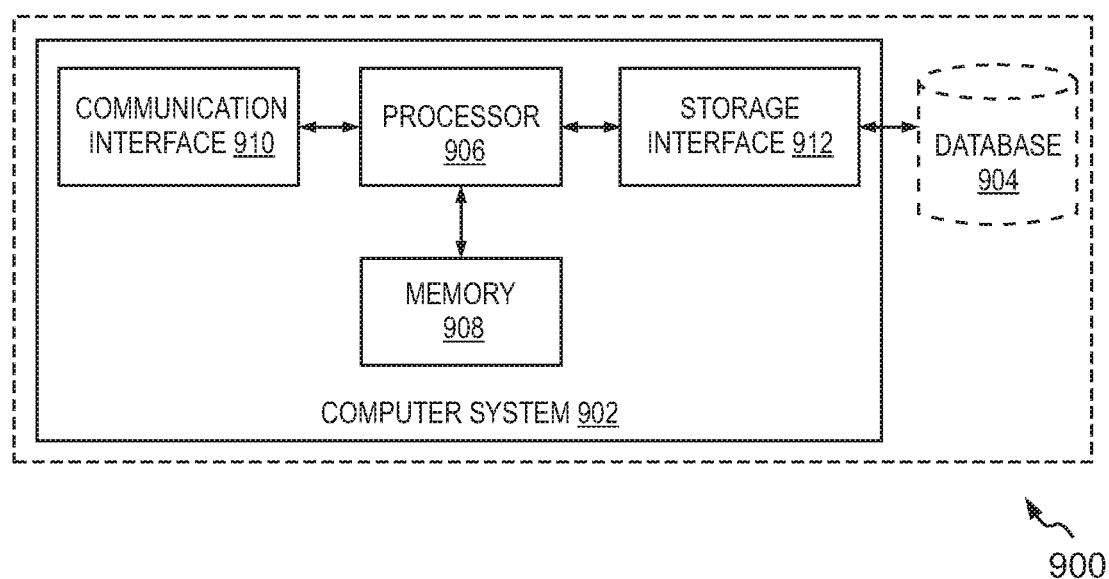
FIG. 9 is a simplified block diagram of a server system, which is an example of the summarization engine.

FIG. 9 is a simplified block diagram of a server system 900, in accordance with one embodiment of the present disclosure. The server system 900 is an example of the summarization engine 102 deployed within the environment 100. The server system 900 may include multiple computer systems and databases such a computer system 902 and a database 904. The computer system 902 may be a computer system in a cloud network (e.g., public or private cloud) or a machine that operates or supports a distributed big data processing framework. Only one instance of the computer system 902 and the database 904 are shown in FIG. 9, however, it is noted that there may be multiple such devices used in the cloud network or for the distributed big data processing framework.

The computer system 902 includes a processor 906 for executing instructions. Instructions may be stored in, for example, but not limited to, a memory 908. The processor 906 may include one or more processing units (e.g., in a multi-core configuration). The processor 906 is operatively coupled to a communication interface 910 such that the computer system 902 is capable of communicating with remote devices such as the data sources 104 (shown in FIG. 1)

The processor 906 may also be operatively coupled to the database 904. The database 904 is any computer-operated hardware suitable for storing and/or retrieving data. In a non-limiting example, the database 904 may include any kind of standalone storage devices or distributed storage devices used in a cloud network, or used with any distributed big data processing framework.

In other embodiments, the database 904 is external to computer system 902 and may be accessed by the computer system 902 using a storage interface 912. The storage interface 912 is any component capable of providing the processor 906 with access to the database 904. The storage interface 912 may include, for example, devices associated with Cloud Data Management Interface (CDMI), devices associated with cloud computing interface, Web API interface, cloud storage gateway, Internet Small Computer Systems Interface (iSCSI), a SAN adapter, a network adapter, and/or any component providing the processor 906 with access to the database 904.

Figure 10:
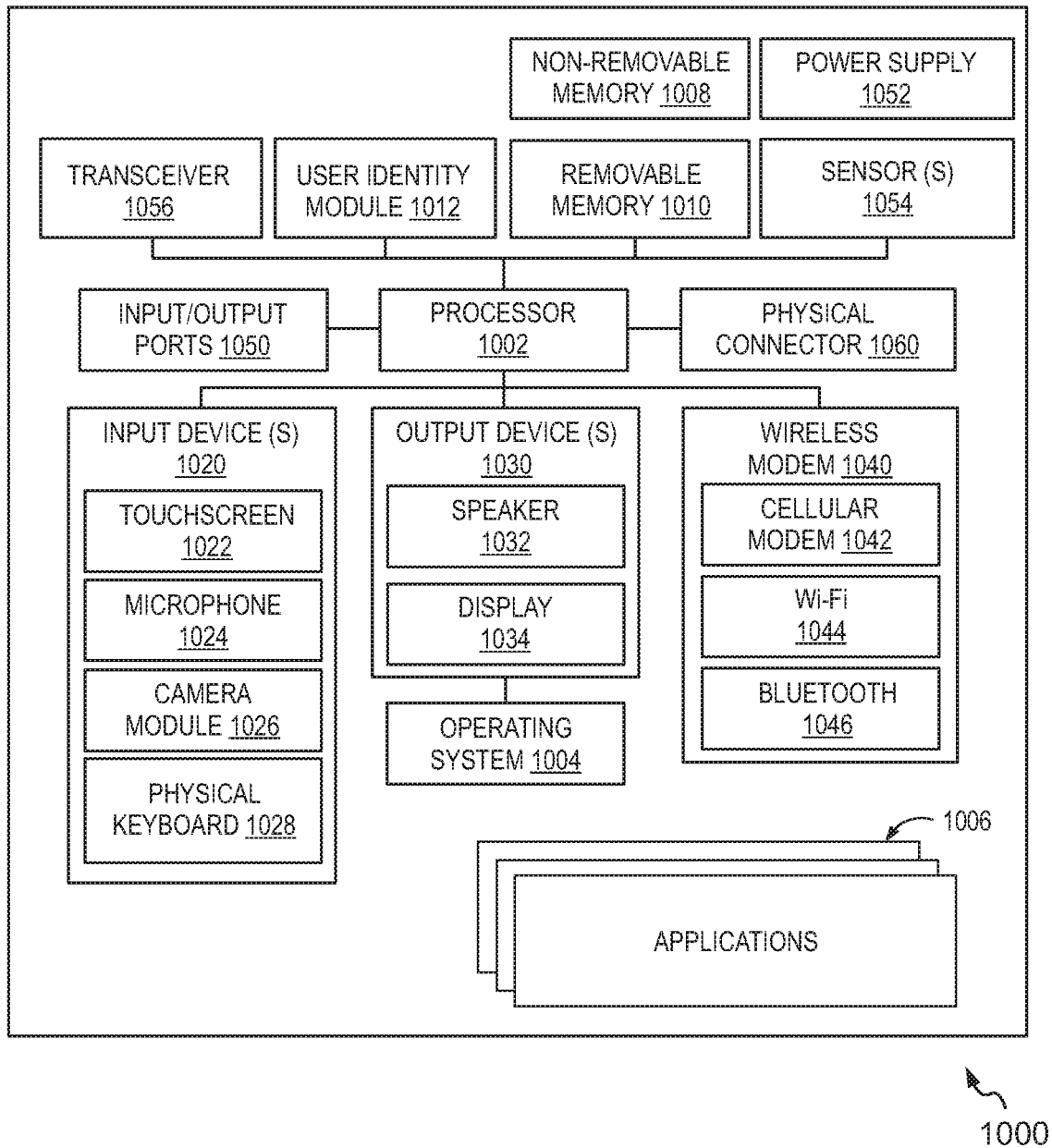
FIG. 10 is a block diagram of a user device, in accordance with an example embodiment.

FIG. 10 is a simplified block diagram of a user device 1000 for example, a mobile phone capable of implementing the various embodiments of the present disclosure. The user device 1000 is an example of the user devices 108, 110, 112 and 114 shown in FIG. 1. It should be understood that the user device 1000 as illustrated and hereinafter described is merely illustrative of one type of device and should not be taken to limit the scope of the embodiments. As such, it should be appreciated that at least some of the components described below in connection with that the user device 1000 may be optional and thus in an example embodiment may include more, less or different components than those described in connection with the example embodiment of the FIG. 10. As such, among other examples, the user device 1000 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the user device 1000 and support for one or more applications programs (see, applications 1006). In addition to the application interface, the applications 1006 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1000 includes one or more memory components, for example, a non-removable memory 1008 and/or removable memory 1010. The non-removable memory 1008 and/or removable memory 1010 may be collectively known as database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The user device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1000 can support one or more input devices 1020 and one or more output devices 1030. Examples of the input devices 1020 may include, but are not limited to, a touch screen/a screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in the FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the mobile phone 1000 and a public switched telephone network (PSTN).

The user device 1000 can further include one or more input/output ports 1050 for establishing connection with peripheral devices including a power supply 1052, one or more sensors 1054 for example, an accelerometer, a gyroscope, a compass, or an infrared proximity sensor for detecting the orientation or motion of the user device 1000 and biometric sensors for scanning biometric identity of an authorized user, a transceiver 1056 (for wirelessly transmitting analog or digital signals) and/or a physical connector 1060, which can be a USB port, IEEE 1094 (FireWire) port, and/or RS-232 port. The illustrated components are not required or all-inclusive, as any of the components shown can be deleted and other components can be added.

With the application (see, applications 1006) and/or other software or hardware components, the user device 1000 can implement the technologies described herein. For example, the processor 1002 can receive the summarized content from the server system 900 and display on the user device 1000 for the user.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry). Particularly, the server system 800 and its various components such as the computer system 902 and the database 904 may be enabled using software and/or using transistors, logic gates, and electrical circuits (for example, integrated circuit circuitry such as ASIC circuitry).

The server system 900 as illustrated and hereinafter described is merely illustrative of a system that could benefit from embodiments of the invention and, therefore, should not be taken to limit the scope of the invention. It may be noted that the server system 900 may include fewer or more components than those depicted in FIG. 9. As explained above, the server system 900 may be included within or embody an electronic device. Moreover, the server system 900 may be implemented as a centralized system, or, alternatively, the various components of server system 900 may be deployed in a distributed manner while being operatively coupled to each other.

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 9. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application/or implementation without departing from the spirit or scope of the disclosure.

What is claimed is:

1. A method for automatic summarization of content, comprising:
    accessing, by a processor, a plurality of stories from a plurality of data sources for a predefined time, each story of the plurality of stories being associated with a media item;
    plotting, by the processor, the plurality of stories over the predefined time for determining one or more peaks;
    extracting, by the processor, a set of stories among the plurality of stories from each peak of the one or more peaks in the predefined time;
    detecting, by the processor, one or more themes from the set of stories using Latent Dirichlet Allocation (LDA) algorithm for classifying the set of stories based on the one or more themes, each theme of the one or more themes being associated with a group of stories wherein detecting the one or more themes comprises:
    tokenizing, by the processor, each story of the set of stories into a token vector as a separate document, and
    assigning, by the processor, each token vector with a corresponding identifier, wherein the identifier is pre-programmed and is associated to a profile identifier;
    determining, by the processor, at least one subset of stories for each theme from the group of stories representing the set of stories in the one or more peaks using Restricted Boltzmann Machines (RBM) algorithm;
    accessing, by the processor, one or more user profiles of one or more users, each user profile comprising profile information related to a user of the one or more users; and
    generating, by the processor, a summarized content for each user of the one or more users based on an associated user profile and the at least one subset of stories, the summarized content being an aggregation of the at least one subset of stories based on an associated theme.

2. The method as claimed in claim 1, further comprising:
    providing, by the processor, the summarized content to each user of the one or more users at a predefined interval based on a mode of communication.

3. The method as claimed in claim 1, wherein determining the one or more peaks comprises:
    accessing, by the processor, one or more historical data points from a historical set of data points for the predefined time;
    detecting, by the processor, the one or more peaks based on the one or more historical data points, wherein the one or more peaks are determined using a peak detection algorithm; and
    determining, by the processor, an outlier if at least one peak of the one or more peaks exceeds a threshold value, wherein at least one story from the outlier is used for determining a theme associated with the at least one story.

4. The method as claimed in claim 1, wherein determining the at least one subset of stories comprises:
    converting, by the processor, the group of stories into a set of feature vectors, each story being associated with a feature vector of the set of feature vectors;
    training, by the processor, one or more RBM models for each story of the group of stories using an associated feature vector, each RBM model comprising at least one of an input layer and a hidden layer;
    determining, by the processor, a first set of data associated with the set of feature vectors from the hidden layer, wherein each data of the first set of data correspond to a hidden layer representation of each feature vector of the set of feature vectors; and
    clustering, by the processor, the first set of data into one or more clusters for determining the at least one subset of stories.

5. The method as claimed in claim 4, wherein clustering comprises:
    analyzing, by the processor, the one or more clusters for determining at least one cluster among the first set of data based on one or more parameters;
    determining, by the processor, at least one feature vector associated with a data of the first set of data closest to centroid of the at least one cluster; and
    delivering, by the processor, the story associated with the feature vector.

6. The method as claimed in claim 1, wherein detecting the one or more themes further comprises:
    accessing, by the processor, a textual content of the set of stories associated with the one or more peaks; and
    performing, by the processor, the LDA algorithm on each token vector for detecting a theme associated with each story.

7. The method as claimed in claim 6, further comprising:
    comparing, by the processor, each theme of the one or more themes with remaining themes of the one or more themes to determine a set of similarity values, wherein each similarity value associated with:
    two or more themes are merged together when the similarity value is greater than a similarity threshold value; and
    two or more themes are retained when the similarity value is lesser than the similarity threshold value.

8. The method as claimed in claim 1, wherein the media item is one or more of:
    a news article;
    a television broadcast;
    a social media post;
    a blog article; and
    a speech given at public or private platform.

9. The method as claimed in claim 1, wherein the plurality of data sources is one or more of:
    a social networking platform;
    a newspaper;
    a news broadcasting platform;
    an e-commerce website;
    a blog;
    a magazine; and
    a talk show.

10. The method as claimed in claim 1, wherein plotting the plurality of stories comprises:
    determining, by the processor, one or more of:
    a temporal extent of each peak of the one or more peaks in the predefined time;
    one or more users associated with the set of stories in the one or more peaks; and at least one theme associated with the set of stories in the one or more peaks.

11. The method as claimed in claim 1, wherein the media item is associated with at least one of:
   a brand;
   a product;
   a person;
   an event; and
   a service.

12. A server system for automatic summarization of content, comprising:
   a memory configured to store instructions; and
   a processor configured to execute the instructions stored in the memory and thereby cause the server system to perform:
   access a plurality of stories from a plurality of data sources for a predefined time, each story of the plurality of stories being associated with a media item;
   plot the plurality of stories over the predefined time for determining one or more peaks;
   extract a set of stories among the plurality of stories from each peak of the one or more peaks in the predefined time; and
   detect one or more themes from the set of stories using Latent Dirichlet Allocation (LDA) algorithm for classifying the set of stories based on the one or more themes, each theme of the one or more themes being associated with a group of stories wherein for detecting the one or more themes the server system is further caused to at least:
      tokenize each story of the set of stories into a token vector as a separate document, and
      assign each token vector with a corresponding identifier, wherein the identifier is preprogrammed and is associated to a profile identifier;
   determine at least one subset of stories for each theme from the group of stories representing the set of stories in the one or more peaks using Restricted Boltzmann Machines (RBM) algorithm;
   access one or more user profiles of one or more users, each user profile comprising profile information related to a user of the one or more users; and
   generate a summarized content for each user of the one or more users based on an associated user profile and the at least one subset of stories, the summarized content being an aggregation of the at least one subset of stories based on an associated theme.

13. The server system as claimed in claim 12, wherein the server system is further caused to at least:
   provide the summarized content to each user of the one or more users at a predefined interval based on a mode of communication.

14. The server system as claimed in claim 12, wherein for determining the one or more peaks the server system is further caused to at least:
   access one or more historical data points from a historical set of data points for the predefined time;
   detect the one or more peaks based on the one or more historical data points, wherein the one or more peaks are determined using a peak detection algorithm; and
   determine an outlier if at least one peak of the one or more peaks exceeds a threshold value, wherein at least one story from the outlier is used for determining a theme associated with the at least one story.

15. The server system as claimed in claim 12, wherein for determining the at least one subset of stories the server system is further caused to at least:
   convert the group of stories into a set of feature vectors, each story being associated with a feature vector of the set of feature vectors;
   train one or more RBM models for each story of the group of stories using an associated feature vector, each RBM model comprising at least an input layer and a hidden layer;
   determine a first set of data associated with the set of feature vectors from the hidden layer, wherein each data of the first set of data correspond to a hidden layer representation of each feature vector of the set of feature vectors; and
   cluster the first set of data into one or more clusters for determining the at least one subset of stories.

16. The server system as claimed in claim 15, wherein for clustering the server system is further caused to at least:
   analyze the one or more clusters for determining at least one cluster among the first set of data based on one or more parameters;
   determine at least one feature vector associated with a data of the first set of data closest to centroid of the at least one cluster; and
   deliver the story associated with the feature vector.

17. The server system as claimed in claim 12, wherein for detecting the one or more themes the server system is further caused to at least:
   access a textual content of the set of stories associated with the one or more peaks; and
   perform the LDA algorithm on each token vector for detecting a theme associated with each story.

18. The server system as claimed in claim 17, wherein the server system is further caused to at least:
   compare each theme of the one or more themes with remaining themes of the one or more themes to determine a set of similarity values, wherein each similarity value associated with:
   two or more themes are merged together when the similarity value is greater than a similarity threshold value; and
   two or more themes are retained when the similarity value is lesser than the similarity threshold value.

19. A summarization engine for automatic summarization of content, comprising:
   a memory configured to store summarization instructions;
   a communication interface for receiving a plurality of stories from a plurality of data sources at a predefined time, each story of the plurality of stories being associated with a media item;
   a processor in operative communication with the communication interface, the processor configured to execute the summarization instruction to cause the summarization engine to perform:
   plotting the plurality of stories over the predefined time for determining one or more peaks;
   extracting a set of stories among the plurality of stories from each peak of the one or more peaks in the predefined time;
   detecting one or more themes from the set of stories using Latent Dirichlet Allocation (LDA) algorithm for classifying the set of stories based on the one or more themes, each theme of the one or more themes being associated with a group of stories, wherein detecting the one or more themes comprises:
   tokenizing each story of the set of stories into a token vector as a separate document, and assigning each token vector with a corresponding identifier, wherein the identifier is preprogrammed and is associated to a profile identifier;

determining at least one subset of stories for each theme from the group of stories representing the set of stories in the one or more peaks using Restricted Boltzmann Machines (RBM) algorithm; and generating a summarized content based on the at least one subset of stories.

20. The summarization engine as claimed in claim 19, further comprising:

a user database for storing one or more user profiles associated with one or more users, wherein the processor is configured to access the one or more user profiles from the user database for customizing the summarized content for the one or more users based on respective user profiles.

\* \* \* \* \*